(12) United States Patent
Pessi

(10) Patent No.: US 7,949,772 B2
(45) Date of Patent: May 24, 2011

(54) PROTOCOL ENGINE APPLICATION INTERFACE

(75) Inventor: Pekka Pessi, Helsinki (FI)

(73) Assignee: Nokia Corporation, Espoo (FI)

( * ) Notice: Subject to any disclaimer, the term of this patent is extended or adjusted under 35 U.S.C. 154(b) by 788 days.

(21) Appl. No.: 10/516,282

(22) PCT Filed: May 31, 2002

(86) PCT No.: PCT/IB02/02936
§ 371 (c)(1),
(2), (4) Date: Mar. 9, 2005

(87) PCT Pub. No.: WO03/102806
PCT Pub. Date: Dec. 11, 2003

(65) Prior Publication Data
US 2005/0223104 A1    Oct. 6, 2005

(51) Int. Cl.
*G06F 15/16* (2006.01)
(52) U.S. Cl. .......................... 709/230; 709/203; 370/338
(58) Field of Classification Search .......... 709/223–225, 709/230
See application file for complete search history.

(56) References Cited

U.S. PATENT DOCUMENTS 5,809,235 A * 9/1998 Sharma et al. ................. 709/230
6,134,244 A 10/2000 Van Renesse et al.
6,845,397 B1 * 1/2005 Lavian et al. ................. 709/230
6,976,054 B1 * 12/2005 Lavian et al. ................. 709/203
7,016,966 B1 * 3/2006 Saulpaugh et al. ........... 709/230
2001/0055315 A1 12/2001 Hu
2002/0024943 A1 * 2/2002 Karaul et al. ................. 370/338

FOREIGN PATENT DOCUMENTS
EP        0 969 628 A2    1/2000

OTHER PUBLICATIONS

Zou et al, "Prototyping SIP-based VoIP services in Java" WCC 2000—ICCT 2000. 2000 International Conference on Communication Technology Proceedings (Cat. No. 00EX420), Proceedings of the 16*th* International Conference on Communication Technology, Aug. 21-25, 2000, pp. 1395-1399, vol. 2, XP002227133.
Jain et al, "Java/sup TM/ call control (JCC) and session initiation protocol (SIP)", IEICE Transactions on Communications, Dec. 2001, Inst. Electron. Inf. & Commun. Eng., Japan, vol. E84-B, No. 12, pp. 3096-3103, XP002227134.
Sasaki et al, "Java TM Call Controll v1.0 to Session Initiation Protocol Mapping", Jain TM Community, online, Oct. 25, 2001, XP002227135, retrieved form the Internet: URL:http://java.sun.com/products/jain/JCC2SIP.pdf.
Official Communication issued in the corresponding EP application No. 02 749 192.7, dated Jul. 31, 2008.
Norman C. Hutchinson et al.; "RPC in the χ-Kernel: Evaluating New Design Techniques"; Operating sysgtems Review (SIGOPS); 23; 1989; No. 5; pp. 91-101; New York, US.
Jiri Kuthan; "Accelerating SIP"; Jan. 2002; Retrieved from the Internet: URL: http://iptel.org/~jiri/publications/sip2002-kuthan-acc00.pdf>.

* cited by examiner

*Primary Examiner* — Jeffrey Pwu
*Assistant Examiner* — Sulaiman Nooristany
(74) *Attorney, Agent, or Firm* — Mintz, Levin, Cohn, Ferris, Glovsky & Popeo, P.C.

(57) ABSTRACT

There is disclosed an interface block for providing application access to the underlying protocol engine at several different layers. These layers are preferably the application core layer, the transaction layer, and the transport layer.

12 Claims, 4 Drawing Sheets

PROTOCOL ENGINE APPLICATION INTERFACE

FIELD OF THE INVENTION

The present invention relates to applications which use underlying protocol engines. The invention is particularly but not exclusively related to multimedia applications, and SIP, the IP telephony signaling protocol.

BACKGROUND TO THE INVENTION

Multimedia applications are increasingly utilised, particularly in mobile wireless applications.

In any such applications, an application must have access to an underlying protocol engine. A common protocol engine in IP (Internet protocol) telephony is the Session Initiation Protocol (SIP).

The most popular API specification for SIP is known as JAIN SIP API. It is a collection of Java interfaces implementing access to SIP protocol engines at a transaction level.

The JAIN SIP API is inflexible, hard to extend, underspecified and does not suit well proxy applications.

It is therefore an object of the present invention to provide an improved access for application to an underlying protocol engine, particularly but not exclusively for the case where that protocol engine is a SIP engine.

SUMMARY OF THE INVENTION

In accordance with the present invention there is provided a method of providing access from an application to an underlying protocol engine at a plurality of different layers.

Said access is preferably provided through a transaction layer.

Access may be provided through an interface of the transaction layer at a plurality of different layers.

Access may be provided at an application core layer. Said access may be to calls.

Access may be provided at a transaction layer. Access may be to transactions.

Access may be provided at a transport layer. Said access may be to a stateless message transport.

There may further additionally be provided other application core functionality.

There may further be provided session initiation protocol functionality to the application.

The application may be IP telephony.

A request message may be processed, as is well known, in dependence on a comparison of the top most Via header of the message. At least part of the request routing may implemented as part of a dialog matching code. There may be provided a failure-proof fallback code for routing and processing logic.

The application may be a multimedia application.

In accordance with the present invention there is further provided an interface adapted to provide access between an application and an underlying protocol engine at a plurality of different layers.

The interface may be formed in a transaction layer. The transaction layer may be adapted to provide an interface at the plurality of different layers.

An interface may be provided at an application core layer. The interface may be provided at a transaction layer. The interface may be provided at a transport layer.

There may further be provided means for implementing further application core functionality above the interface.

There may further be provided means below the interface functionality.

The invention is thus a software interface and underlying middleware for SIP. It provides an easy-to-use and flexible framework for creating SIP applications. Its features make it easy to create correct and robust SIP software that can make use of later protocol extensions.

The invention provides versatile means for a IP telephony application writer to add SIP functionality to their application. While the applications may be very different from each other, it is beneficial to use common middleware components implementing the core SIP protocol functionality.

The interface provides versatile access to an SIP protocol engine in particular. The application (e.g. proxy server, redirect server) can be stateful or stateless, the application can itself assemble all messages or it can let the interface complete them. The application can let the interface filter out extra messages not affecting the application state, like 100 Trying. Most function calls take extra named arguments, thus making it easy to pass extra arguments to lower layers taking care of transport or message syntax.

The applications can customize the parsing process. For example, they can avoid parsing irrelevant headers or cache the message contents if it will be forwarded. Adding new headers is trivial, and does not affect the interface.

Because implementation allows the application to create new header classes at run time, it is possible to add new headers without compiling anything.

Applications can let the interface take care of tasks belonging to the application core layer, like routing requests or responses according to DNS data, matching incoming requests with dialogs, or matching incoming requests with existing server transaction objects.

BRIEF DESCRIPTION OF THE DRAWINGS

The invention is now described by way of example with reference to the accompanying figures in which.

DESCRIPTION OF THE PREFERRED EMBODIMENTS

The present invention is described herein by way of reference to a particular non-limiting example. One skilled in the art will appreciate that the invention may be more broadly applicable.

The invention is described herein with particular reference to an implementation in a software for internet applications (SOFIA) implementation. A block diagram of an exemplary SOFIA architecture is shown in FIG. 1, including a signalling subsystem adapted in accordance with a preferred embodiment of the present invention.

It is assumed in the following discussion that the skilled reader is familiar with the well-known session initiation protocol (SIP), session description protocol (SDP) and other signalling protocols as discussed hereinbelow. The implementation of such protocols does not form part of the present invention in so far as such implementations are not described herein.

Figure 1:
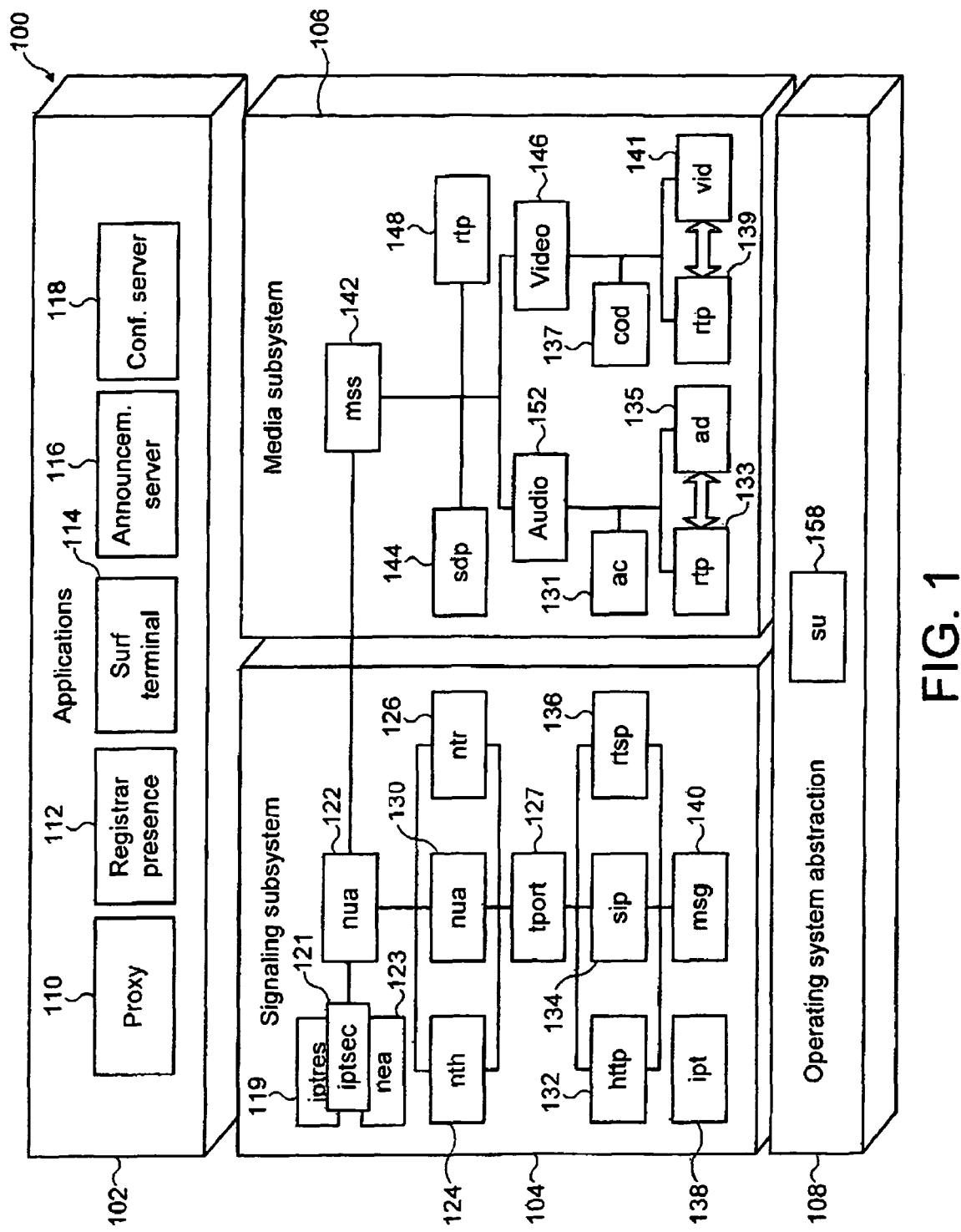
FIG. 1 shows in block diagram form an example architecture of a multimedia application.

Referring to FIG. 1, the SOFIA architecture includes a set of applications 102, a signalling subsystem 104, a media subsystem 106, and an operating system abstraction layer 108.

The applications 102 include, in the example shown, a proxy server application 110, a registrar/presence server application 112, a simple ubiquitous rich-call facilitator (SURF) server application 114, and media server applications such as announcement server 116 and conference server application 118.

The signalling subsystem 104 includes iptres, iptsec, and nea blocks 119, 121 and 123 respectively, a Nokia user agent API (NUA) 122, a Nokia Transaction API (NTA) 130, a nth 124, a ntr 126, a transport block 127, an IP telephony utility library (IPT) 138, a http block 132, a SIP block 134, a RTSP block 136, and a protocol independent message block (MSG) 140. The nea block 123 is a Nokia event API block. The NTA module 130 implements the SIP dialogs and transactions. The tport module 106 implements message transport. The sip module 110 provides syntax and encoding for different SIP headers. The msg module 108 provides generic SMTP-like abstract syntax-and encoding primitives. The tport 106 and msg 108 modules can be shared by other protocols, like RTSP or HTTP.

The elements of the media subsystem 106 include a multimedia subsystem block 142, which realises the interface with the signalling subsystem 104, an SDP block 144 for defining session, media and codec descriptions, an RTP block 148 for transporting media over IP, and including a jitter buffer, packet video module 146 for video conferencing and an audio module 152. The audio module is further associated with an audio device 135, a codec 131, and an RTP block 133. The video module 146 is further associated with a codec 137, a video device 141, and an RTP block 139.

The operating system abstraction layer 108 includes an SU block 158 containing an SU library.

In FIG. 1, the signalling subsystem 104 may be considered to be a control part of the application, and the media subsystem may be considered to be a media part of the application.

A detailed description of a preferred embodiment of the present invention is given hereinbelow.

The NTA block 130 is an application programming interface (API) between an IPT application and a transaction-layer session initiation protocol (SIP) protocol engine. It should be noted that although the present invention is described by way of reference to a specific implementation which utilises the Nokia Transaction API, the skilled person reading the following description will appreciate that the functionality provided by the present invention may be more broadly applied.

The NTA block 130 provides means, in accordance with a preferred embodiment of the present invention, for an application to:
1. Establish transport protocol endpoint(s), which are used to receive and send SIP messages;
2. Create client transactions;
3. Process and respond to server transactions;
4. Create, send and respond to SIP messages (in stateless mode); and
5. Create dialogs or dialog templates.

Referring to point 1 above, the transport protocol endpoints (also known as sockets) are established when an NTA agent object (nta_agent_t) is created. The application can control what kind of sockets are created by supplying a URL as a parameter to the NTA block 130. According to the URL, the sockets can be bound to well-known SIP port(s), or to ephemeral ports. Also, the URLs specify which transport protocol(s) are supported.

The NTA interface provides access to SIP protocol methods/primitives at three different layers: dialogs at an application core layer, transactions at a transaction layer, and stateless message transport at a transport layer.

Figure 2:
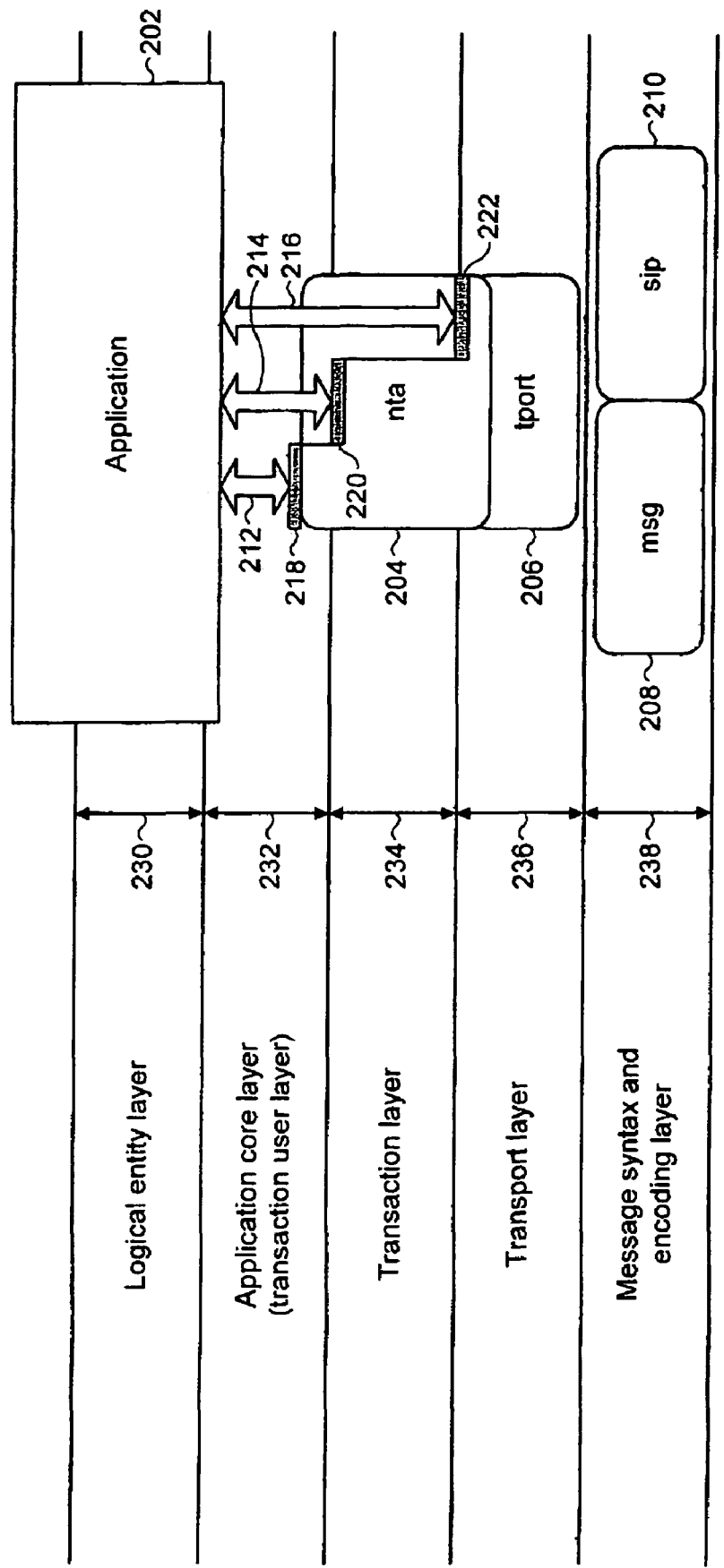
FIG. 2 illustrates the logical layers and their interconnectivity in an exemplary embodiment of the present invention.

With reference to FIG. 2, the As shown in FIG. 2, there is illustrated an application block 202, a NTA block 204, a transport block 206, a MSG block 208 and a SIP block 210.

As also shown in FIG. 2, the SIP protocol is structured to five layers. The lowest layer 238 is the message syntax layer. The next layer 236 is the message transport layer. The next layer 234 is the transaction layer. These three layers 234, 236, 238 behave in an identical way in all SIP elements.

On top of transaction layer 234 is the application core layer 232, which defines three different cores: the User Agent Client (UAC) core, the User Agent Server (UAS) core and the proxy core. An application core defines common rules for basic transaction processing and dialog handling, for instance. The SIP protocol specification also defines a few logical entities: User Agent, Registrar, Redirect Server, Stateless Proxy, Stateful Proxy, and Back-to-Back User Agent. A logical entity describes a role in which a SIP application participates to a SIP operation.

Finally, the highest layer is the logical entity layer 230.

In accordance with the preferred embodiment of the present invention, the NTA interface block 204 provides an application access to the underlying protocol engine at three different layers: dialogs at the application core layer 232 as represented by interface 218; transactions at the transaction layer as represented by interface 220; and stateless message transport at the transport layer as represented by interface 222.

A separate piece of middleware (such as the software for Internet package (SOFIA) NUA User-Agent library) may implement the rest of the application core functionality on top of the NTA.

As shown in FIG. 2, in this embodiment of the invention the functionality below the NTA API block is provided by four software modules: the nta block 204 itself; the transport bock 206 tport; the SIP block 210 sip; and the MSG block 208 msg.

As explained further hereinbelow, an application can extend the functionality provided by the underlying layers without modifying or affecting the transaction layer.

Different applications use greatly varying numbers of parameters with the NTA API. For example, while the simplest application can just provide the method name and dialog when creating a transaction, a sophisticated application may include many other parameters ranging from Call-Info containing rich caller identification to overriding 100-filtering attributes. The NTA API in accordance with this embodiment of the present invention therefore provides a flexible way to include optional parameters in function call parameters.

The NTA approach preferably uses named parameters. Named parameters are passed using a special macro expanding to a tag/value pair (this pair can be considered as a constructor). For instance, the tag item macro SIPTAG_SUBJECT_STR(sub) expands to tag siptag_subject_str and string sub. The argument lists are typesafe if the definition uses special inline function casting the value to tag_value_t as follows:

```
#define SIPTAG_SUBJECT_STR(v) \
    siptag_subject_str, siptag_subject_str_v(v)
inline tag_value_t siptag_subject_str_v(char const *s) {
    return (tag_value_t)s);
}
extern tag_type_t siptag_subject_str;
```

Outside parameter lists, the tag and the value are stored in an object called tag item, (tagi_t) defined as follows:

```
typedef struct tag_type_s const *tag_type_t;
typedef unsigned long tag_value_t;  /* integral type that
can hold a pointer */
typedef struct {
    tag_type_t t_tag;
    tag_value_t t_value;
} tagi_t;
```

The tag is a pointer to a special structure specifying the name of the tag and the type of the tag value.

A tag list can refer to another tag list, therefore making it possible to pass the argument list from one layer to another.

There are tags for SIP headers, NTA attributes, URLs, etc. An application can create its own tags to describe, for instance, a new extension header used by it.

For example, initiating an INVITE transaction in an SIP sesion with a given subject and a couple of rich caller identification URIs would look like this:

```
orq = nta_outgoing_tcreate(
    dialog, &process_response, &call_context,
    NULL,
    SIP_METHOD_INVITE,
    NULL, /* RequestURI, From, To, Call-ID, CSeq are
    provided by dialog */
    SIPTAG_SUBJECT_STR(subject),
    SIPTAG_CALL_INFO_STR(icon_url),
    SIPTAG_CALL_INFO_STR(calling_card_url),
    SIPTAG_CONTENT_TYPE_STR("application/sdp"),
    SIPTAG_PAYLOAD(sdp),
    NTATAG_100_TRYING(true), /* Don't filter 100 Trying
    from next proxy */
    TAG_END( ));
```

Preferably, the 100 Trying messages of an SIP sesion are filtered by the NTA. In this embodiment, however, the application gives a user complete feedback for the call progress, including the first 100 Trying.

The prototype for nta_outgoing_tcreate( ) is as follows:

```
nta_outgoing_t *
nta_outgoing_tcreate(nta_leg_t *leg,
                     nta_response_f *callback,
                     nta_outgoing_magic_t *magic,
                     url_string_t const *route_url,
                     sip_method_t method,
                     char const *method_name,
                     url_string_t cont *request_uri,
                     tag_type_t tag, tag_value_t value,
                     ...);
```

The su library provides macros (ta_list, ta_start, ta_args, ta_tags, ta_end) that implement the tag lists for different binary architectures.

Some named arguments specify the semantics followed by NTA. The overall semantic attributes are usually specified with nta_agent_set_params( ) function; in special cases, the semantic attributes can also be provided for each dialogue or transaction separately (like NTATAG_100_TRYING attribute provided in the example above). The semantic attributes include:

ua: if this attribute is set, INVITE transaction is processed according to UAS/UAC semantics.

user_via: if this attribute is set, application is responsible for inserting headers.

pass_100: if this attribute is set, NTA relays also 100 Trying messages to the application. The 100 Trying response messages are not forwarded upstream (towards client)by stateful proxies.

extra_100: if this attribute is set, NTA generates itself a 100 Trying responses after a retransmitted request is received and 200 ms has elapsed from receiving the original request. A SIP transaction server should respond with a preliminary response within 200 ms upon receiving a request. If no other response can be sent, the transaction server can always send a 100 Trying response message.

timeout_408: if this attribute is set, NTA generates a 408 response message when a client transaction times out.

merge_482: if this attribute is set, NTA determines if a request has arrived twice to it and when so happens replies with a 483 Request Merged response message.

Figure 3:
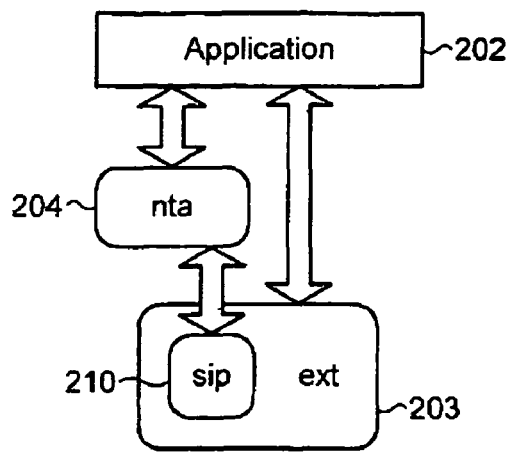
FIG. 3 illustrates a further modification to the exemplary embodiment of FIG. 2.

The application 202 can also provide a message class as a parameter when the NTA agent object is created. The message class is an interface to the SIP message syntax layer. The application can customize the message class according its needs. Also, the transaction or transport modules can further modify the behavior of the message class if, for example, they need to provide extra debugging information. Referring to FIG. 3, there is further illustrated the modification of an SIP application 210 by way of extension 203. An SIP application, in this example, extends the basic SIP parser functionality beyond the basic subset required by the transaction engine.

This is an important aspect of this embodiment of the invention in an environment where either the code footprint or the performance is an issue. A mobile User Agent can reduce the code footprint by only including bare minimum parsing functionality. A high-performance SIP proxy needs only to parse those headers absolutely required by its routing functionality.

Figure 4:
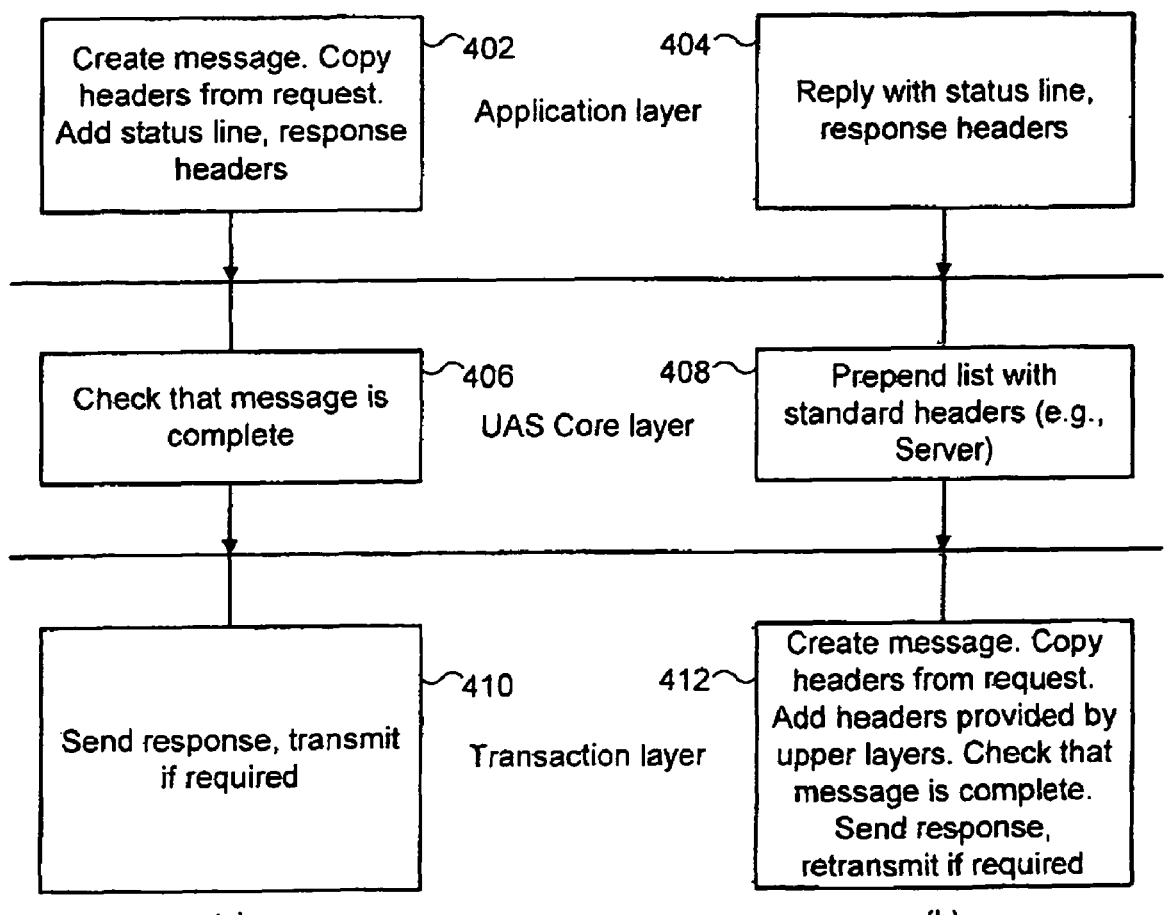
FIG. 4 illustrates a comparison of the advantages of the present invention over the prior art.

Referring to FIG. 4, there is illustrated the difference between the prior art and the present invention. Responding to a request using JAIN SIP API (FIG. 4(a)) and NTA (FIG. 4(b), the NTA takes care of many routine tasks on behalf of the application.

Referring to FIG. 4(a), in the prior art in the application layer 402 a message is created, headers copied from the request, a status line and response headers added.

In the present invention, in the application layer 404 a reply is preferably made with status line, response headers.

In the prior art in the UAS core layer 406, it is checked that the message is complete. In the preferred implementation of the present invention, in the UAS core layer 408 the list is prepended with standard headers (e.g. server).

In the prior art in the transaction layer 410, a response is sent, and a retransmission made if required. In the preferred implementation of the present invention in the transaction layer 412, a message is created. Headers are copies from the request, and headers provided by the upper layers added. It is then checked that the message is complete. The response is sent, and retransmitted if required.

The agent object (nta_agent_t), a dialog object or a server transaction object act as message object factories.

Applications can obtain message objects already populated by basic headers from them, for instance. An application can also choose not to handle messages at all, but rather provide required information (request method, URI, response code, extra headers) to the NTA and let it create the message, populate it with its own headers and header provided by application, and send the message to the network.

A middleware library, for instance, UA Core library, may insert its own headers in the list of named attributes.

For instance, assume that a terminal application answers to a call as follows:

```
ua_call_acccept(&call,
        SIPTAG_CALL_INFO_STR(icon_url),
        SIPTAG_CALL_INFO_STR(calling_card_url),
        TAG_END( ));
```

The UA core library may then add media-processing specific headers (headers related to SDP processing), headers providing information about Supported features, User-Agent, and Contact header used for the future message within the dialog. The library could implement a ua_call_reply( ) function as follows:

```
void ua_call_accept(ua_call_t *call,
        tag_type_t tag, tag_value_t value,
        ...)
{
    ta_list ta;
    ...
    ta_start(ta, tag, value);
    ...    Do the media processing, create sdp
    nta_incoming_treply(call->irq,
            SIP_200_OK,
            SIPTAG_USER_AGENT_STR(call->ua->name),
            SIPTAG_SUPPORTED(call->ua->supported),
            SIPTAG_CONTACT(call->ua->contact),
            SIPTAG_CONTENT_TYPE_STR("application/sdp"),
            SIPTAG_PAYLOAD(sdp),
            TAG_NEXT(ta_tags(ta)));
    ta_end(ta);
}
```

The NTA library may then add all the biolerplate headers to the reply, like From, To, Call-ID, CSeq, Record-Route, Timestamp, etc.

Such detail will be implementation dependent, and within the scope of one skilled in the art.

A SIP dialog is a relationship between two SIP user agents, usually but not always corresponding to an IP telephony call between these user agents. A dialog is specified by Call-ID, local name and its tag, remote name and its tag, and by the remote contact URI. A dialog also contains a route that is used to send the requests. According to the latest SIP specification, the local and remote names are ignored (so they can be modified to better reflect the real identity of call parties after a call redirection, for instance). A dialog also specifies a route to the other SIP UA. A route is a list of SIP URI that the request must traverse, at simplest it just contains the URI of the remote UA.

In addition to the fully specified dialogs (known as legs in NTA documentation), the NTA provides dialog templates (default legs). They are underspecified, i.e., they miss some or all the attributes listed above. They can be used, for example, when a call is being set up and the remote peer is not known. Other uses include routing: an application can ask NTA to route certain request URLs to a given application object. The request URI can also contain a wildcard, for example, a gateway may want to pick up all requests to a certain domain regardless of the user part (usually containing the telephone number) A default leg can also be used when an initial route is used.

NTA can also overspecify dialogs: the application can ask that only requests with certain methods are processed by the leg object.

When a dialog is created, the application must provide NTA with enough information to specify the dialog and establish the route. While the route processing is responsibility of NTA, the application must known when the dialog is established. In basic SIP, a dialog is established with a 200-series response to INVITE, but SIP extensions like 100 rel and events have their own rules for establishing a dialog.

In a preferred embodiment using signaling techniques as described hereinabove, the incoming messages are processed according to the following algorithm:

1. If the message is a request:
  a) If the topmost Via header has a branch parameter starting with "z9hG4bK" (branch parameter starting with "z9hG3bK" identify a request formed according to the SIP-bis specification, and uniquely identify a transaction together with host and port value from the Via header), hash h1 is calculated from branch parameter, host and port from topmost Via header. A server transaction from hash table 1 is searched for. If a matching transaction (with the same Via branch parameter, host and port) is found, the message is given to the server transaction-object to process.
  If no matching transaction is found, the next step is proceeded to.
  b) Hash h2 is calculated from Call-ID header and CSeq sequence number. A server transaction from hash table 2 is searched for. If a transaction (with matching Call-ID, CSeq number, RequestURI, From and To headers, and topmost Via header) is found, the message is given to the transaction object to process.
  If no matching transaction is found, the next step is proceeded to.
  c) If an incomplete match with different topmost Via header was found in step (b), and the transaction object has a ua or merge_482 attribute set, the message is given to the transaction object. (Request is either an ACK message acknowledging a 200-series response to an INVITE, or an merged request).
  Otherwise, the next step is proceeded to.
  d) Hash h3 is calculated from the Call-ID. A matching dialog leg is searched for from hash table 3. If a leg (with matching RequestURI, Call-ID, From and To headers) is found, the request is given to the leg object to process. The leg object creates a new server transaction object (object inherits semantic attributes from leg), inserts the transaction into hash tables 1 and 2, and lets the application respond to the request.
  Otherwise, the next step is proceeded to.
  e) If an incomplete match is found, the request is given to the leg object to process as in step 1(d)
  Otherwise, the next step is proceeded to.
  Note that here, RequestURI as well as Call-ID, From or To headers may be unspecified (wildcarded).
  f) Hash h4 is calculated from RequestURI. A matching default leg is searched for from hash table 4. If a leg (with matching RequestURI) is found, the request is given to the leg object to process as in the step 1(f).
  Otherwise, the next step is proceeded to.
  Note that here RequestURI may be unspecified (wildcarded)

g) Let the application process request statelessly. If the application does not implement stateless processing, proceed to the next step.

h) If the application does not implement stateless processing, reply with an application-provided response code (by default, 500 Internal Server Error)

2. If the message is a response:

a) It is checked that the topmost Via header is valid and has originated from this instance of NTA. If the check fails, the message is discarded.

Otherwise, the next step is proceeded to.

b) Hash h5 is calculated from branch parameter of topmost Via. A client transaction from hash table 5 is searched for. If a matching transaction (with same Via branch parameter) is found, a response message is given to the transaction object to process.

Otherwise, the next step is proceeded to.

c) The application then processes the request statelessly. If the application does not implement stateless processing, the next step is proceeded to.

d) It is checked if the response is a final response to an INVITE transaction. If it is, an ACK request is sent. If the response is a 200-series reply, a BYE is also sent immediately.

Otherwise, the message is discarded.

3. Otherwise, if the message is not a request or a response it is discarded.

Figure 5:
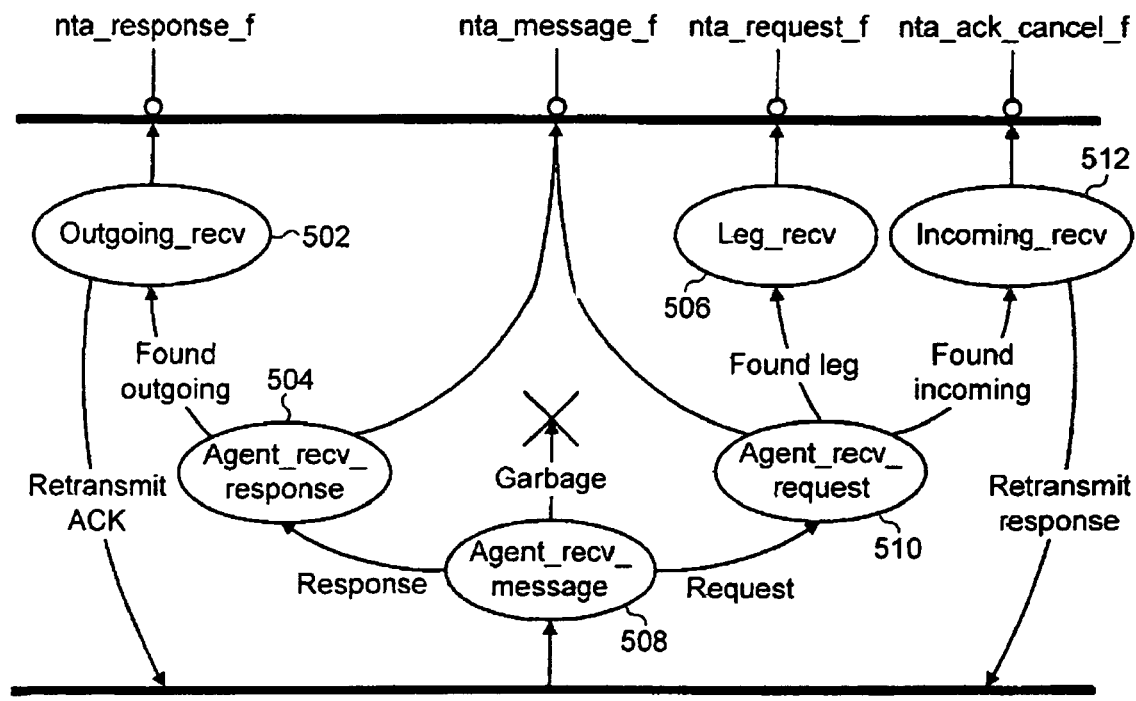
FIG. 5 illustrates a state diagram associated with an exemplary embodiment of the invention.

Referring to FIG. 5, there is shown a state diagram associated with the above described method, the operation of which will be apparent to one skilled in the art. As can be seen in FIG. 5, the states shown are outgoing_recv 502, agent_recv_response 504, agent recv_message 508, agent_recv_request 510, leg recv 506, and incoming_recv 512.

In summary, the present invention therefore provides, in the preferred embodiments, an SIP middleware that can be used in: SIP user agents (terminals, gateways); SIP proxies (stateful, stateless, session); SIP Back-to-back user agents; SIP registrars; SIP redirect servers (both stateful and stateless); SIP presence servers, etc.

It will be apparent from the description of the above example scenarios that various modifications to the invention are possible. The invention, and embodiments thereof, provides several advantages, some of which are stated hereafter.

Advantageously, the invention consistently uses URLs for addressing.

Embodiments of the invention use typesafe named argument lists. Named argument lists are used to transparently pass optional arguments through middleware layers (application core, transaction). Extension of functionality is possible without modifying intermediate software layers.

Attributes changing the NTA semantics means that the transaction function may be tailored for a particular application (UA/proxy).

Advantageously attributes from agent and dialog are inherited.

Embodiments of the present invention provide an extensible message factory object. The parser is provided by the application. The message syntax is extensible and can be tailored for the application. The application does not have to know about the needs of underlying layers. If the application does not use a header, it can be left unparsed (and the header parsing and manipulation code can be removed). Different applications can have different view on some headers.

Step 1(c) in the method described above offers the advantage of the UA not needing to keep a hash table identical to h2, but the topmost Via.

Step 1(e) in the method described above allows part of the request routing to be implemented as a part of the dialog matching code.

Step 1(f) in the method described above allows part of the request routing to be implemented as part of the dialog matching code Step 1(h) in the method described above provides a failure proof fallback code for routing logic.

Step 2(d) in the method described above provides a common fallback code for obscure failure cases.

The invention also advantageously provides the possibility to specify only minimum amounts of arguments when making a request or replying to it. Complexity is removed from application (potentially in many places) to the transaction function (implemented only once)

Whilst the present invention has been described herein by way of reference to particular examples, it is not limited to those examples. The scope of the invention is defined by the appended claims.

The invention claimed is:

1. A method, comprising:
providing access, with an application programming interface, to an underlying session initiation protocol engine at a plurality of different session initiation protocol layers, said different session initiation protocol layers comprising a transaction layer, an application core layer, and a transport layer, wherein the session initiation protocol engine is implemented on at least one processor and comprises the application programming interface, wherein the provided access includes access to dialogs at the application core layer, session initiation protocol transactions at the transaction layer, and stateless message transport at the transport layer,
wherein access to the plurality of different session initiation protocol layers is provided by at least one parameter to the application programming interface, wherein the at least one parameter modifies the functionality of at least one of the plurality of different session initiation protocol layers, wherein the at least one parameter comprises at least one named parameter passed based on a macro, wherein the application programming interface creates a message in response to a request using the at least one parameter, the created message is checked at the application programming interface for completeness and sent as a response to the request from an application accessing the application programming interface, and wherein at least one of the response or the request that is at least one of received or transmitted includes a failure-proof fallback code for routing logic.

2. The method according to claim 1, wherein the application comprises an internet protocol telephony application separate from the session initiation protocol engine and application programming interface.

3. The method according to claim 1, wherein the application is IP telephony.

4. The method according to claim 1, wherein access to the session initiation protocol engine is requested by a request message that is processed by comparing a portion of the topmost Via header of the message with an entry stored in memory and determining if a match has occurred.

5. The method according to claim 1, wherein access to the session initiation protocol engine is requested by a request message that is received which includes a request routing, and at least part of the request routing is implemented as part of a dialog matching code.

6. The method according to claim 1, wherein the application is a multimedia application.

7. An apparatus, comprising:
a processor comprising
an application programming interface configured to provide access to an underlying session initiation protocol engine at a plurality of different session initiation protocol layers, said plurality of different session initiation protocol layers comprising
a transaction layer,
an application core layer, and
a transport layer,
wherein the provided access includes access to dialogs at the application core layer, session initiation protocol transactions at the transaction layer, and stateless message transport at the transport layer, wherein access to the plurality of different session initiation protocol layers is provided by at least one parameter to the application programming interface, wherein the at least one parameter modifies the functionality of at least one of the plurality of different session initiation protocol layers, wherein the at least one parameter comprises at least one named parameter passed based on a macro, wherein the application programming interface creates a message in response to a request using the at least one parameter, the created message is checked at the application programming interface for completeness and sent as a response to the request from an application accessing the application programming interface, and wherein at least one of the response or the request that is at least one of received or transmitted includes a failure-proof fallback code for routing logic.

8. The apparatus according to claim 7, wherein the application programming interface is formed in a transaction layer, the transaction layer is configured to provide an interface at the plurality of different session initiation protocol layers.

9. The apparatus according to claim 7, wherein there is provided further application core functionality above the application programming interface.

10. The apparatus according to claim 7, wherein there is further provided functionality below the application programming interface.

11. A computer program embodied on a non-transitory computer readable medium, said computer program configured to control a processor to perform:
providing access, with an application programming interface, to an underlying session initiation protocol engine at a plurality of different session initiation protocol layers, said different session initiation protocol layers comprising a transaction layer, an application core layer, and a transport layer, wherein the provided access includes access to dialogs at the application core layer, session initiation protocol transactions at the transaction layer, and stateless message transport at the transport layer, and
wherein access to the plurality of different session initiation protocol layers is provided by at least one parameter to the application programming interface, wherein the at least one parameter modifies the functionality of at least one of the plurality of different session initiation protocol layers, wherein the at least one parameter comprises at least one named parameter passed based on a macro, wherein the application programming interface creates a message in response to a request using the at least one parameter, the created message is checked at the application programming interface for completeness and sent as a response to the request from an application accessing the application programming interface, and wherein at least one of the response or the request that is at least one of received or transmitted includes a failure-proof fallback code for routing logic.

12. An apparatus, comprising:
a processing means comprising
a first application programming interface means for providing access to an underlying session initiation protocol engine at a plurality of different session initiation protocol layers, said plurality of different session initiation protocol layers comprising
a transaction layer,
an application core layer, and
a transport layer,
wherein the provided access includes access to dialogs at the application core layer, session initiation protocol transactions at the transaction layer, and stateless message transport at the transport layer, wherein access to the plurality of different session initiation protocol layers is provided by at least one parameter to the application programming interface, wherein the at least one parameter modifies the functionality of at least one of the plurality of different session initiation protocol layers, wherein the at least one parameter comprises at least one named parameter passed based on a macro, wherein the application programming interface creates a message in response to a request using the at least one parameter, the created message is checked at the application programming interface for completeness and sent as a response to the request from an application accessing the application programming interface, and wherein at least one of the response or the request that is at least one of received or transmitted includes a failure-proof fallback code for routing logic.

* * * * *